Feb. 17, 1953 A. R. WEINRICH 2,628,921

METHOD OF PRODUCING AN INTERMEDIATE METALLIC OXIDE FILM IN A MULTIPLE LAYER ARTICLE

Filed April 18, 1949 2 SHEETS—SHEET 1

*INVENTOR.*
ARTHUR R. WEINRICH
BY
Whittemore, Hulbert & Belknap
ATTORNEYS

| | THICKNESS OF LAYERS IN ANGSTROM UNITS | | | | | | OXIDIZING CONDITIONS | | PRODUCT PROPERTIES | | | |
|---|---|---|---|---|---|---|---|---|---|---|---|---|
| | 1ST. | 2ND. | 3RD. | 4TH. | OXDZD | TOTAL | °F | TIME HOURS | %LIGHT TRANS-MISSION | %REFLECTION 1ST. SURF | %REFLECTION 2ND. SURF | RESIST., OHMS PER SQUARE |
| EX.# 1 | Sn | Ag | | | $SnO_2$ | | | | | | | |
| | 10 | 500 | | | 13 | 513 | — | — | 7 | 59 | 70 | |
| | | | | | | | 700 | 1.0 | 10 | 56 | 62 | |
| EX.# 2 | Pb | Pt | | | PbO | | | | | | | |
| | 32 | 19 | | | 41 | 60 | — | — | 88 | 10 | 9 | |
| | | | | | | | 400 | 1.5 | 89 | 9 | 8 | |
| EX.# 3 | Mg | MgF | | | MgO | | | | | | | |
| | 11 | 1200 | | | 9 | 1209 | — | — | 92.5 | 6 | 6.2 | |
| | | | | | | | 840 | 0.5 | 93 | 5.6 | 5.9 | |
| EX.# 4 | Al | MgF | | | $Al_2O_3$ | | | | | | | |
| | 14 | 1200 | | | 22 | 1222 | — | — | 80 | 5 | 8 | |
| | | | | | | | 840 | 0.5 | 93 | 5.9 | 6.2 | |
| EX.# 5 | Pb | Au | Pb | | Pbo | | | | | | | |
| | 16 | 48 | 16 | | 20.5 | 89 | — | — | 46 | 25 | 11 | 66 |
| | | | | | | | 400 | 0.5 | 67 | 15 | 7 | 50 |
| EX.# 6 | Al | Au | Al | | $Al_2O_3$ | | | | | | | |
| | 18.6 | 48 | 18.6 | | 27.5 | 103 | — | — | 37 | 33 | 17 | 70 |
| | | | | | | | 700 | 0.5 | 72 | 18 | 12 | 22 |
| | 28 | 48 | 28 | | 43 | 134 | — | — | 30 | 32 | 15 | 160 |
| | | | | | | | 1000 | .085 | 72 | 12 | 7 | 60 |
| | 14 | 48 | 42 | | 67 | 134 | — | — | 27 | 39 | 20 | 90 |
| | | | | | | | 1000 | .085 | 77 | 15 | 10 | 22 |
| | 56 | 48 | 56 | | 87 | 222 | — | — | 17 | 47 | 31 | 58 |
| | | | | | | | 700 | 16 | 77 | 11 | 6 | 60 |
| | 9.3 | 48 | 133 | | 205 | 267 | — | — | 40 | 19 | 16 | 60 |
| | | | | | | | 800 | 0.25 | 70 | 5 | 6 | — |
| EX.# 7 | Al | Au | Al | $SiO_2$ | $Al_2O_3$ | | | | | | | |
| | 4.6 | 48 | 4.6 | 225 | 7 | 287 | — | — | 70 | 12 | 4 | 35 |
| | | | | | | | 800 | 0.25 | 72 | 12 | 6 | 30 |
| | 9.3 | 48 | 9.3 | 225 | 14.5 | 302 | — | — | 70 | 11 | 5.3 | 60 |
| | | | | | | | 800 | 0.25 | 77 | 9.4 | 5.8 | 30 |
| | 28 | 48 | 28 | 225 | 43 | 359 | — | — | 30 | 25 | 15 | 130 |
| | | | | | | | 800 | 1 | 78 | 9.2 | 5.5 | 100 |
| | 9.3 | 40 | 4.6 | 450 | 7 | 511 | — | — | 75 | 5 | 5.4 | 75 |
| | | | | | | | 1000 | 0.25 | 84 | 5 | 5.4 | 36 |
| | 9.3 | 48 | 4.6 | 450 | 7 | 519 | — | — | 75 | 5 | 7 | 50 |
| | | | | | | | 700 | 0.25 | 84 | 4 | 5.6 | 18 |

FIG. 6.

INVENTOR.
ARTHUR R. WEINRICH
BY
Whittemore, Hulbert & Belknap
ATTORNEYS

Patented Feb. 17, 1953 2,628,921

UNITED STATES PATENT OFFICE 2,628,921

METHOD OF PRODUCING AN INTERMEDIATE METALLIC OXIDE FILM IN A MULTIPLE LAYER ARTICLE

Arthur R. Weinrich, North Wilkesboro, N. C., assignor to Libbey-Owens-Ford Glass Company, Toledo, Ohio, a corporation of Ohio Application April 18, 1949, Serial No. 88,188

10 Claims. (Cl. 117—62)

This invention provides a means of forming metallic oxide films which constitute intermediate layers in multiple layer articles such as mirrors, low reflection articles, filters, electrical conducting articles, etc. One use of the process is in the forming of bonding means or intermediate transparent films in such articles. The preparation of the articles involves successively depositing layers from a vapor and a further oxidation of certain intermediate films to form the desired film.

The present invention may therefore be considered broadly as a method of providing an intermediate oxidized film in a multiple layer article. Described in general terms the present invention comprises successively depositing a plurality of films on a support, a designated intermediate one of which is a readily oxidizable film which is to be a metallic oxide film in the final product, and after deposition of the outer films or coating, oxidizing the designated film by subjecting the laminated article to oxidizing conditions in an oxygen-containing atmosphere. The oxidizing conditions are normally characterized by elevated temperatures, the article carrying the plurality of layers being heated for a time in an air or oxygen-containing atmosphere at a temperature of 150 degrees Fahrenheit to 1200 degrees Fahrenheit or more such as to cause the oxidizing gas to penetrate the layers and oxidize the designated films.

Preferably the deposition of the successive films is carried out by thermal evaporation in a vacuum. By this method, substantially uniform, continuous films may be deposited with excellent control over film thickness. Moreover, since several films are deposited generally within the same vacuum the necessity for varying the degree of vacuum is avoided. Contamination between layers is also avoided. However, I may deposit one or more of the films within a vacuum by sputtering. Certain films may also be deposited from a vapor upon a heated surface such as nickel, from a nickel carbonyl gas; or silica, or tin oxide, or titanium oxide, by reaction of the corresponding respective tetra chloride vapors upon a hot glass surface.

The designated readily oxidizable film may be any solid readily oxidizable metal, such for example, as aluminum, barium, magnesium, titanium, iron, copper, manganese, sodium, zirconium, zinc, or chromium, or it may be a solid metallic oxide which partially breaks down in the deposition process to metal or to lower undesired oxides, such for example, as aluminum sesquioxide, stannic oxide or cupric oxide, or it may be a solid metallic oxide which is subject to oxidation such as ferrous oxide, aluminum monoxide, etc.

In some cases the intermediate oxidizable film may be composed of a mixture of two or more oxidizable materials such as aluminum and magnesium, or may be in fact two or more separate films directly in contact with each other and which are both oxidized in place. The invention also includes the simultaneous oxidation of two or more intermediate films which may be separated by another film or films. The oxidized intermediate layers produced are in all cases metallic oxides, or compounds between such metallic oxides as spinels for example, or mixtures of the metallic oxides.

With the foregoing general description in mind, it is an object of the present invention to provide a method of forming an intermediate oxidized film or metallic oxide film in a multiple layer article.

It is a further object of the present invention to oxidize an intermediate film of a multiple layer article through one or more overlying films or coatings.

It is a further object of the present invention to produce a multiple layer article in which a coating is strongly bonded to a support body by depositing a film subject to oxidation on the support body, thereafter depositing a coating over said film, and finally oxidizing said film through said coating to produce an oxidized coating which acts as a bond.

As a further object of the invention means are provided for a process whereby metallic oxide coatings are formed in multi layer coated articles forming low reflection articles or forming mirrors.

Figure 6 is a table giving values of seven specific examples.

The multiple layer articles produced by the practice of the present invention include a support body which may be glass or other vitreous siliceous material such as porcelain, tile, ceramic, earthenware, aluminum silicate, calcium silicate, mica, silica, a self-supporting metal sheet, or any suitable material as may be required for use in the particular article desired. The article produced may thus have applied to the support an opaque or partially transparent mirror film where the support has a smooth surface, a color producing film, a reflection producing or reflection reducing film, a conducting film, or the like. The support as such or the support plus adjacent attached films may be considered as a support structure on which other outer films are deposited and oxidized.

Figure 1:
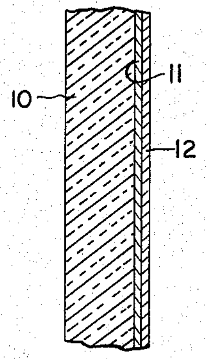
Figure 1 is a fragmentary section through a multiple layer article comprising a pair of thin films.

In Figure 1 there is illustrated a support body 10, which may be glass, an intermediate film 11, which in the completed article may be a metal oxide, such as tin oxide, lead oxide, magnesium oxide, aluminum oxide; or a metallic oxide compound, such as a spinel, for example spinel or magnesium aluminate. The coating 12 comprises a substantially oxygen pervious layer which is relatively difficult to oxidize.

The layers difficult to oxidize used in the various articles formed under this invention may be a solid metal such as platinum, palladium, rhodium, iridium, silver or gold; or it may be a reflection altering coating, such as a metallic fluoride, examples being magnesium fluoride, calcium fluoride, or cryolite; it may be a coating of silica or a silicate such as zircon; or it may be a fully oxidized metallic oxide coating such as zirconium dioxide or zinc oxide; or other solid material difficult to oxidize, certain of which coatings are transparent.

By way of specific example, reference is made to Figure 6, which in all cases refers to multiple films deposited on glass.

Example 1 sets forth in tabular form the properties of a silver mirror article, both before and after oxidation, the approximate thickness of the films, and the material of which the films are formed. In this case the intermediate readily oxidizable film is tin, and the coating film is silver. The metal films are first deposited successively in a vacuum by thermal evaporation. The tin film is then oxidized throughout its depth through the silver film to tin oxide by heating for one hour in air at a temperature of 700 degrees Fahrenheit. Light transmission and first and second surface light reflection of the mirror article, before and after oxidation, are given.

In Example 2, the intermediate readily oxidizable film is lead applied by thermal evaporation and the coating film is platinum applied by sputtering in a vacuum. The lead film is oxidized through the platinum film to lead oxide by heating for 1.5 hours in air at a temperature of 400 degrees Fahrenheit. Optical properties of the filter before and after oxidation are given, these properties being light transmission, and first and second surface light reflection.

In Example 3, the intermediate readily oxidizable film is magnesium, and the coating film a reflection reducing film of approximately one-quarter wave length of magnesium fluoride, each applied by thermal evaporation in a vacuum. The magnesium film is then oxidized through the magnesium fluoride film to magnesium oxide by heating in air for five-tenths of an hour at a temperature of 840 degrees Fahrenheit. Light transmission and first and second surface reflection before and after oxidation are given. The light reflection of the coated glass article is less than that of the uncoated glass and is a low reflection article.

In Example 4 the intermediate readily oxidizable film is aluminum, and the coating film is a reflection reducing film of magnesium fluoride, each applied by thermal evaporation successively within the same vacuum. The aluminum film is then oxidized through the coating by heating in air for five-tenths of an hour at a temperature of 840 degrees Fahrenheit. Light transmission and first and second surface reflection, both before and after oxidation, are given. The oxidation of the aluminum to the relatively transparent aluminum oxide will be seen to be indicated by the increase in light transmission after the oxidation. The change in such figure will indicate that the conversion to aluminum oxide of the aluminum is substantially complete throughout its depth.

In the first four examples the multiple layer articles are of the type illustrated in Figure 1, in which two films are provided.

Figure 2:
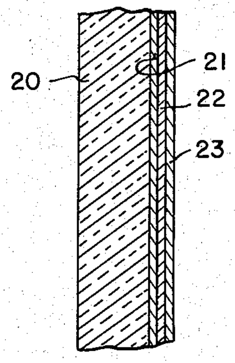
Figure 2 is a fragmentary section through a multiple layer article comprising three thin films.

In Examples 5 and 6, the multiple layer article is as illustrated in Figure 2, comprising a body 20 having three films, the innermost film 21 and the outer film 23 being oxidized, and the remaining film 22 being of a material relatively difficult to oxidize.

In Example 5, the readily oxidizable film first deposited on the glass body 20 is lead followed by a film 22 of gold upon which the third or outer readily oxidizable film of lead is deposited. In the completed article, films 21 and 23 are lead oxide. In this case the gold film and outer lead film or oxidized lead film may be regarded as together comprising a coating for the intermediate lead film. The lead films are oxidized by heating in air for 0.5 hour at a temperature of 400 degrees Fahrenheit. The inner lead film is oxidized through the gold coating, and the outer lead film which is of course first also oxidized to lead oxide. In the column in Figure 6 headed "OXDZD" is given the approximate thickness in angstrom units of the outer lead oxide film. The light transmission and first and second surface reflection are given, as well as the electrical resistance in ohms per square, both before and after oxidation. The product is an electrically conducting transparent coated glass or glass article.

In Example 6 films of aluminum, gold, and aluminum are laid down in order by successive thermal evaporation in a vacuum. The table indicates five different thickness relationships employed in as many samples of the readily oxidizable aluminum films, and the oxidizing conditions are varied conformably. In this case, the column headed "OXDZD" gives the approximate thickness of the outer aluminum oxide film produced in the completed article. Properties of light transmission and first and second surface reflections, as well as electrical resistance in ohms per square, both before and after oxidation, are given. The product is suitable for use as an electrically heated window or windshield in a mobile vehicle such as an automobile or airplane. In such an article the first aluminum oxide film acts to bind the gold to the glass, the gold conducts the electric current, and the outer aluminum oxide film gives some scratch resistance and added durability to the article.

Figure 3:
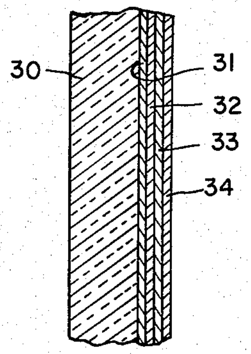
Figure 3 is a fragmentary section through a multiple layer article comprising four thin films.

Figure 3 illustrates the composite article in which the support 30 is provided with four films 31, 32, 33 and 34 on the glass body 30 in the order named.

Example 7 tabulated in Figure 6 is an article of this type and in this example the innermost readily oxidizable film on the surface of the glass is aluminum, the next film 32 is gold, the third film is a readily oxidizable film of aluminum, and the outer film 34 is a heavy film of silica. In the completed article films 31 and 33 are aluminum oxide. In the several articles tabulated in example 7 the thickness of the several films was varied and the oxidizing conditions varied conformably. The approximate film thickness listed in the column headed "OXDZD" is the thickness of the second aluminum oxide film corresponding to film 33 in Figure 3. The glass support and the films 31 and 32 may be considered as a support structure upon which films 33 and 34 are formed. While it is preferred that the four films be deposited successively in one vacuum, it is obvious that a support structure of the type just described may first be formed and the outer two films then produced by a further thermal evaporation and second oxidation treatment. The properties tabulated are light transmission, first and second surface reflection, and electrical resistance in ohms per square both before and after oxidation. The gold and silver were not oxidized or changed chemically by the oxidation treatment.

The several examples described above are given merely to afford a more complete understanding of the invention and are not to be construed as in any sense limiting. The invention is applicable to the production of widely different articles having utility in independent fields of use. Thus in some cases the intermediate oxidized film or films may be water soluble, and hence primarily useful only when provided in an evacuated tube, or when special precautions are taken to insure protection by the type of coating selected.

In general the film to be oxidized may be any of the solid metals with the exception of the metals relatively difficult to oxidize such as those previously listed, although some of these will be useful primarily when protected as by special coatings, or when used in evacuated vessels or tubes, or in controlled atmospheres such as dry inert gas. While specific examples of films to be oxidized are given with detailed information as to film thickness, treatment and properties, and while other materials are mentioned, it is of course impossible to list all of the various materials which may be employed. The present invention therefore involves essentially a method of making a multiple layer article in which an unoxidized or partially unoxidized film of material capable of ready oxidation or further oxidation directly to a metallic oxide is deposited upon a support body or structure and coated with an oxygen pervious coating which comprises a film of material relatively difficult to oxidize and capable of retaining its original character during the subsequent treatment, and finally oxidizing the first film to a metallic oxide through the coating.

The oxidizing step normally includes heating which has the three-fold effect of greatly increasing the permeability of the coating to oxygen and the rate of transfer of oxygen through the coating and also increasing the rate of combination with oxygen of the material of the film to be oxidized.

Figure 4:
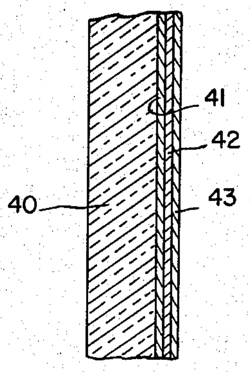
Figure 4 is a fragmentary section through an article comprising three layers of a different arrangement than provided in Figure 2.

In some cases as shown in Figure 4 the film first deposited on the glass 40 or other support body may not be the film which should be oxidized through subsequent deposited coatings. Thus in Figure 4 films 41 and 43 are non-oxidized and film 42 is formed by oxidizing a film. Furthermore, as previously mentioned, there may be two or more films which are oxidized through a coating film or films, and these films to be oxidized may be in contact with each other or separated by a film or films relatively difficult to oxidize.

Figure 5:
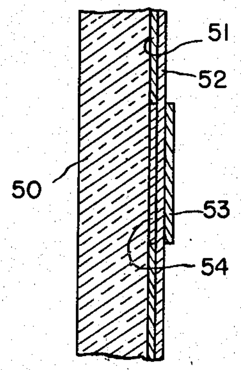
Figure 5 is a fragmentary section through a multiple layer article showing an oxygen impervious mask superimposed over a plurality of films.

In Figure 5 there is shown a further form of the invention in which a readily oxidizable film 54 was first deposited upon a support 50 and thereafter coated with a coating 52 of material relatively difficult to oxidize. A mask 53 such as a fused vitreous coating may be applied to certain portions of the article and prevent the oxidation of the readily oxidizable material 54 lying thereunder. In the unmasked portions, the readily oxidizable material 54 lying under the film 52 is oxidized to a metallic oxide layer 51 by passage of oxygen through the oxygen pervious coating 52 when the structure is heated. Such an article may have utility as a decorative mirror. The oxidation of the intermediate film is preferably carried out so that the film is oxidized substantially completely throughout its depth. As previously stated, the effect of the oxidation of the intermediate film to a metallic oxide may be to increase the bonding action of the intermediate film, or to increase the light transmission of the intermediate film, or both. Accordingly, in the usual case the oxidation is continued until the film is substantially completely oxidized throughout. In some cases as for example where a portion of the oxygen pervious coating is provided with an oxygen impervious mask, oxidation of that portion of the intermediate film underlying the mask will not take place.

Where the term "difficult to oxidize" is applied to a film or coating, it is intended to define a film which will not oxidize substantially under the oxidizing conditions employed. It is recognized of course that some of these films may be oxidized slightly but the intent is to cover films which in the completed article are substantially in the same chemical condition as when deposited.

While for the most part, the coating film or films will be metals or metallic compounds, this is not necessarily true in all cases. Thus for example the coating films may be silica, applied directly to a bonding or other intermediate film such as an aluminum film which is then oxidized through the silica film.

The invention has another important application in that it may be employed to oxidize a bonding or other intermediate film from a lower oxide to a higher oxide. This is particularly true in the production of optical articles, in which the use of the relatively transparent higher oxides is in many cases preferable to the ordinary darker lower oxides.

The drawings and the foregoing specification constitute a description of the improved method of producing an intermediate metallic oxide film in a laminated article in such full, clear, concise and exact terms as to enable any person skilled in the art to practice the invention, the scope of which is indicated by the appended claims.

What I claim as my invention is:

1. The method of making a multiple layer article having an intermediate film of a metal oxide produced by oxidation through a subsequently applied coating which comprises: positioning a support structure in an evacuated chamber, establishing a vacuum in said chamber; depositing by thermal evaporation upon the support structure within said chamber a film of a readily oxidizable metallic material of such thickness that it may be substantially completely oxidized throughout its depth through a subsequently applied coating; depositing by thermal evaporation directly upon said film within said chamber while maintaining said vacuum an outer coating of a material difficult to oxidize of such thickness as to be pervious to the passage of oxygen at an elevated temperature; breaking the vacuum in said chamber; and thereafter heating said article in an oxidizing atmosphere at an elevated temperature and for a time selected in accordance with the thicknesses and materials of said film and said coating to substantially completely oxidize said intermediate film throughout its depth through said coating without substantially oxidizing said outer coating.

2. The method as defined in claim 1 in which the readily oxidizable metallic material is a metal.

3. The method as defined in claim 1 in which the readily oxidizable metallic material is aluminum.

4. The method as defined in claim 1 in which the readily oxidizable metallic material is tin.

5. The method as defined in claim 1 in which the readily oxidizable metallic material is lead.

6. The method as defined in claim 1 in which the readily oxidizable metallic material is iron.

7. The method as defined in claim 1 in which the readily oxidizable metallic material is titanium.

8. The method as defined in claim 1 in which the outer coating is a metallic fluoride.

9. The method as defined in claim 1 in which the outer coating is magnesium fluoride.

10. The method of making a multiple layer article having an intermediate film of aluminum oxide which comprises: providing on a support structure by deposition from a vapor a film of aluminum of such thickness that it may be substantially completely oxidized throughout its depth through a subsequently applied coating; thereafter superimposing in intimate contact on said film by deposition from a vapor an outer coating of a metallic fluoride of such thickness as to be pervious to the passage of oxygen at an elevated temperature; and thereafter heating said article in an oxidizing atmosphere at an elevated temperature and for a time selected in accordance with the thicknesses and materials of said film and said coating to substantially completely oxidize said intermediate film throughout its depth through said coating without substantially oxidizing said outer coating.

ARTHUR R. WEINRICH.

REFERENCES CITED

The following references are of record in the file of this patent:

UNITED STATES PATENTS

| Number | Name | Date |
|---|---|---|
| 2,131,187 | Liebmann | Sept. 27, 1938 |
| 2,281,474 | Cartwright et al. | Apr. 28, 1942 |
| 2,304,182 | Lang | Dec. 8, 1942 |
| 2,366,687 | Osterberg | Jan. 2, 1945 |
| 2,386,876 | Ogle et al. | Oct. 16, 1945 |
| 2,394,930 | McRae | Feb. 12, 1946 |
| 2,429,420 | McMaster | Oct. 21, 1947 |